US011800211B2

(12) United States Patent
Lee et al.

(10) Patent No.: US 11,800,211 B2
(45) Date of Patent: Oct. 24, 2023

(54) CAMERA MODULE INCLUDING MULTIPLE LENS BARRELS

(71) Applicant: SAMSUNG ELECTRO-MECHANICS CO., LTD., Suwon-si (KR)

(72) Inventors: Ta Kyoung Lee, Suwon-si (KR); Young Hwan Kwon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 62 days.

(21) Appl. No.: 17/377,467

(22) Filed: Jul. 16, 2021

(65) Prior Publication Data
US 2021/0344823 A1 Nov. 4, 2021

Related U.S. Application Data

(63) Continuation of application No. 16/562,501, filed on Sep. 6, 2019, now Pat. No. 11,102,387.

(30) Foreign Application Priority Data

Oct. 26, 2018 (KR) .................. 10-2018-0129132
Apr. 1, 2019 (KR) .................. 10-2019-0037838

(51) Int. Cl.
*H04N 23/55* (2023.01)
*G02B 13/00* (2006.01)
(Continued)

(52) U.S. Cl.
CPC ........... *H04N 23/55* (2023.01); *G02B 13/001* (2013.01); *G03B 3/10* (2013.01); *H04N 23/54* (2023.01); *H04N 23/51* (2023.01)

(58) Field of Classification Search
CPC .. H04N 5/2254; H04N 5/2253; H04N 5/2252; G02B 13/001; G02B 7/102;
(Continued)

(56) References Cited

U.S. PATENT DOCUMENTS 9,020,334 B1 4/2015 Suzuka
10,334,146 B2 6/2019 Im et al.
(Continued)

FOREIGN PATENT DOCUMENTS

CN 108459451 A 8/2018
CN 207937740 U 10/2018
(Continued)

OTHER PUBLICATIONS

Chinese Office Action dated Apr. 30, 2021 issued in counterpart Chinese Patent Application No. 201911004666.3. (5 pages in English)(6 pages in Chinese).
(Continued)

*Primary Examiner* — Twyler L Haskins
*Assistant Examiner* — Angel L Garces-Rivera
(74) *Attorney, Agent, or Firm* — NSIP Law

(57) ABSTRACT

A camera module includes a housing defining an internal space; a reflection module disposed in the internal space and including a reflective member and a holder movably supported by an inner wall of the housing; and a lens module provided in the internal space, and including lenses aligned in an optical axis direction so that light reflected by the reflective member is incident to the lenses. The lens module includes lens barrels accommodating the lenses, and the plurality of lens barrels move in an approximate optical axis direction in the internal space while being supported by ball bearings. At least two of the lens barrels share a guide groove to guide movements of the ball bearings.

18 Claims, 13 Drawing Sheets

(51) Int. Cl.
*G03B 3/10* (2021.01)
*H04N 23/54* (2023.01)
*H04N 23/51* (2023.01)

(58) Field of Classification Search
CPC .... G02B 13/0065; G02B 27/646; G02B 7/09; G03B 3/10; G03B 17/17; G03B 2205/0007; G03B 2205/0046; G03B 2205/0053; G03B 5/00; G03B 5/02; G03B 3/00; G03B 13/36; G03B 17/12; H02K 33/18
See application file for complete search history.

(56) References Cited

U.S. PATENT DOCUMENTS

| | | | | |
|---|---|---|---|---|
| 10,534,194 | B2* | 1/2020 | Lee | G02B 27/646 |
| 11,102,387 | B2* | 8/2021 | Lee | G02B 13/001 |
| 2005/0174657 | A1 | 8/2005 | Honsho | |
| 2014/0009631 | A1 | 1/2014 | Topliss | |
| 2015/0042870 | A1 | 2/2015 | Chan et al. | |
| 2018/0120674 | A1 | 5/2018 | Avivi et al. | |
| 2018/0239162 | A1 | 8/2018 | Lee et al. | |
| 2018/0367714 | A1 | 12/2018 | Im et al. | |
| 2019/0004328 | A1 | 1/2019 | Lee et al. | |

FOREIGN PATENT DOCUMENTS

| | | |
|---|---|---|
| CN | 207992659 U | 10/2018 |
| JP | 2011-81426 A | 4/2011 |
| KR | 10-2016-0042066 A | 4/2016 |
| KR | 10-2018-0012150 A | 5/2018 |
| KR | 10-2018-0095420 | 8/2018 |

OTHER PUBLICATIONS

Korean Office Action dated Feb. 9, 2021 in counterpart Korean Patent Application No. 10-2019-0037838. (8 pages in English)(6 pages in Korean).

Korean Office Action dated Aug. 14, 2020 in counterpart Korean Patent Application No. 10-2019-0037838 (12 pages in English, 9 pages in Korean).

* cited by examiner

CAMERA MODULE INCLUDING MULTIPLE LENS BARRELS

CROSS-REFERENCE TO RELATED APPLICATIONS

This application is a continuation of U.S. application Ser. No. 16/562,501 filed on Sep. 6, 2019, now U.S. Pat. No. 11,102,387, which claims the benefit under 35 USC 119(a) of Korean Patent Application No. 10-2018-0129132 filed on Oct. 26, 2018 and Korean Patent Application No. 10-2019-0037838 filed on Apr. 1, 2019 in the Korean Intellectual Property Office, the entire disclosures of which are incorporated herein by reference for all purposes.

BACKGROUND

Field

The following description relates to a camera module.

Description of Background

Camera modules have generally been installed in portable electronic devices such as tablet personal computers (PCs), laptop computers, and the like, in addition to smartphones, and an autofocusing (AF) function, an optical image stabilization (OIS) function, a zoom function, and the like, have been added to camera modules for mobile terminals.

For the implementation of various functions, however, structures of camera modules have become complex and sizes of the camera modules have been increased, resulting in portable electronic devices in which camera modules are to be mounted having increased sizes.

Additionally, in the case of directly moving a lens or an image sensor for optical image stabilization, both the weight of the lens or the image sensor itself and those of other members having the lens or the image sensor attached thereto need to be taken into consideration. This requires more than a certain level of driving force, thereby increasing power consumption.

Further, for implementation of the AF and zoom functions, a certain distance needs to be secured so that the lens can move in an optical axis direction. However, it may be difficult to implement such configuration due to the thinness of the camera module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module having a simple configuration and a reduced size while implementing functions such as autofocusing (AF), optical image stabilization (OIS) and zoom.

A camera module, in spite of having a plurality of lens groups, in which the plurality of lens groups may be easily aligned in an optical axis direction.

In one general aspect, a camera module includes a housing defining an internal space; a reflection module disposed in the internal space and including a reflective member and a holder movably supported by an inner wall of the housing; and a lens module provided in the internal space, and including lenses aligned in an optical axis direction so that light reflected by the reflective member is incident to the lenses. The lens module includes lens barrels accommodating the lenses, and the plurality of lens barrels move in an approximate optical axis direction in the internal space while being supported by ball bearings. At least two of the lens barrels share a guide groove to guide movements of the ball bearings.

The guide groove may be disposed in a surface of the housing that is parallel to the optical axis direction.

The at least two lens barrels that share the guide groove may implement a zoom function, and another one of the lens barrels may implement an auto-focusing (AF) function.

The at least two lens barrels that share the guide groove may implement a zoom function, and remaining lens barrels, other than the at least two lens barrels, may implement an auto-focusing (AF) function.

The remaining lens barrels may include one lens barrel.

The plurality of lens barrels may include a first lens barrel and a second lens barrel, and the first lens barrel and the second lens barrel may share the guide groove.

The ball bearings may include first ball bearings disposed between the housing and the first lens barrel and second ball bearings disposed between the housing and the second lens barrel.

The first lens barrel may include a first magnet to interact with a first coil disposed in the housing, and the second lens barrel may include a second magnet to interact with a second coil disposed in the housing.

The ball bearings may be disposed between a bottom surface of the housing and the plurality of lens barrels, and a pulling yoke and a pulling magnet may be selectively disposed on the bottom surface of the housing and a lower surface of the plurality of lens barrels.

At least some of the plurality of lens barrels may include a driving magnet disposed on only one side surface thereof, and the pulling yoke or pulling magnet may be biased toward the one side surface on which the driving magnet is disposed with respect to a center of the housing.

The at least two lens barrels that share the guide groove may have a same length in the optical axis direction.

The at least two lens barrels that share the guide groove may each include a lens seating portion and an extending portion extending in the optical axis direction.

Each of the extending portions may include a driving magnet.

In another general aspect, a camera module includes a housing defining an internal space; a reflection module disposed in the internal space, and including a reflective member and a holder movably supported by an inner wall of the housing; and a lens module disposed in the internal space, and including lenses aligned in an optical axis direction so that light reflected by the reflective member is incident to the lenses. The lens module includes a plurality of lens barrels accommodating the lenses, and the plurality of lens barrels move in an approximate optical axis direction by a driving magnet disposed in the housing and a driving coil disposed in one or more of the lens barrels. A pulling yoke and a pulling magnet are selectively disposed on a bottom surface of the housing and a lower surface of one or more of the lens barrels. The pulling yoke or pulling magnet is biased toward one side surface of the housing with respect to a center of the housing.

Some of the plurality of lens barrels may include a driving magnet on only one side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
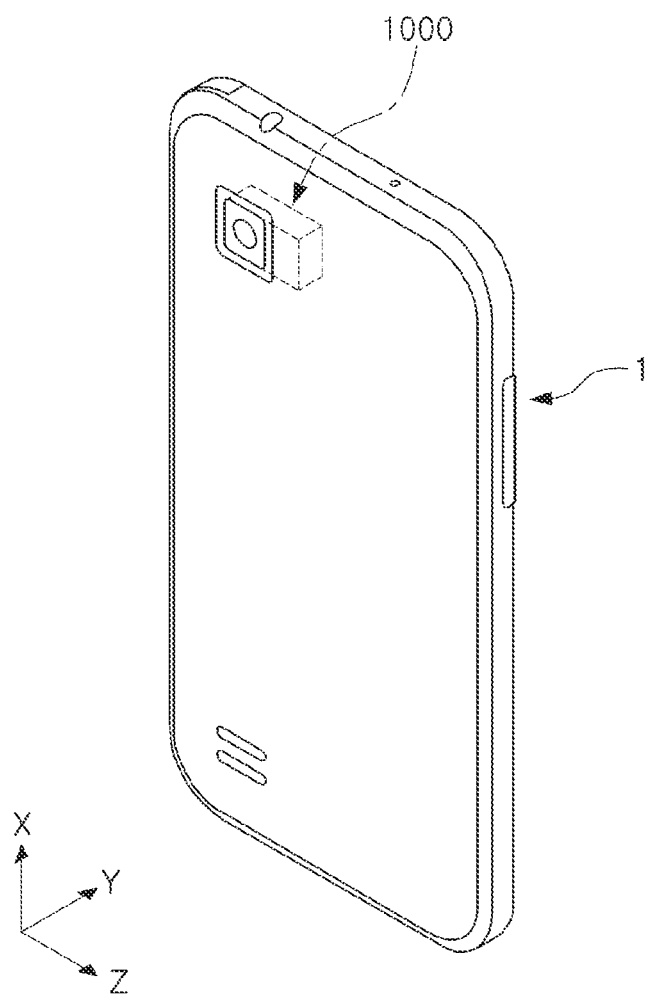
FIG. 1 is a perspective view of a portable electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view of a portable electronic device according to an example.

Referring to FIG. 1, a portable electronic device 1 may be a portable electronic device such as a mobile communications terminal, a smartphone, a tablet personal computer (PC), and the like, in which the camera module 1000 is mounted.

As shown in FIG. 1, the portable electronic device 1 may be provided with the camera module 1000 so as to capture an image of a subject.

The camera module 1000 may include a plurality of lenses, and an optical axis (Z-axis) of the lenses may be disposed in a direction perpendicular to a thickness direction (Y-axis direction or direction from a front surface of the portable electronic device to a rear surface thereof or an opposite direction to the direction from the front surface of the portable electronic device to the rear surface thereof) of the portable electronic device 1.

The optical axis (Z-axis) of the plurality of the lenses provided in the camera module 1000 may be formed in a width direction or length direction (X-axis or Z-axis direction) of the portable electronic device 1.

Therefore, even when the camera module 1000 has the AF, zoom, and OIS functions, and the like, a thickness of the portable electronic device 1 may be minimized. Accordingly, the portable electronic device 1 may be made thinner.

The camera module 1000 may have the AF, zoom, and OIS functions.

The camera module 1000 having the AF, zoom, and OIS functions requires various components, leading to an increased size of the camera module compared to a conventional camera module.

The increased size of the camera module 1000 may give rise to an issue with respect to the miniaturization of the portable electronic device 1 in which the camera module 1000 is mounted.

For example, the camera module has an increasing number of laminated lenses for the zoom function. When multiple lenses are laminated in the thickness direction of the portable electronic device, the thickness of the portable electronic device increases depending on the number of the laminated lenses. Accordingly, a sufficient number of the laminated lenses cannot be secured without increasing the thickness of the portable electronic device, thereby deteriorating the zoom function.

Further, in order to implement the AF and OIS functions, it requires an actuator moving a plurality of lens groups to be installed in the optical axis direction or a direction perpendicular thereto. When the optical axis (the Z-axis) of the lens groups is formed in the thickness direction of the portable electronic device, however, the actuator for moving the lens groups should also be installed in the thickness direction. Accordingly, the thickness of the portable electronic device increases.

However, as the optical axis (the Z-axis) of the plurality of lenses is disposed so as to be perpendicular to the thickness direction of the portable electronic device 1, the portable electronic device 1 may be made thinner even when the camera module 1000 having the AF, zoom, and OIS functions are mounted.

Figure 2:
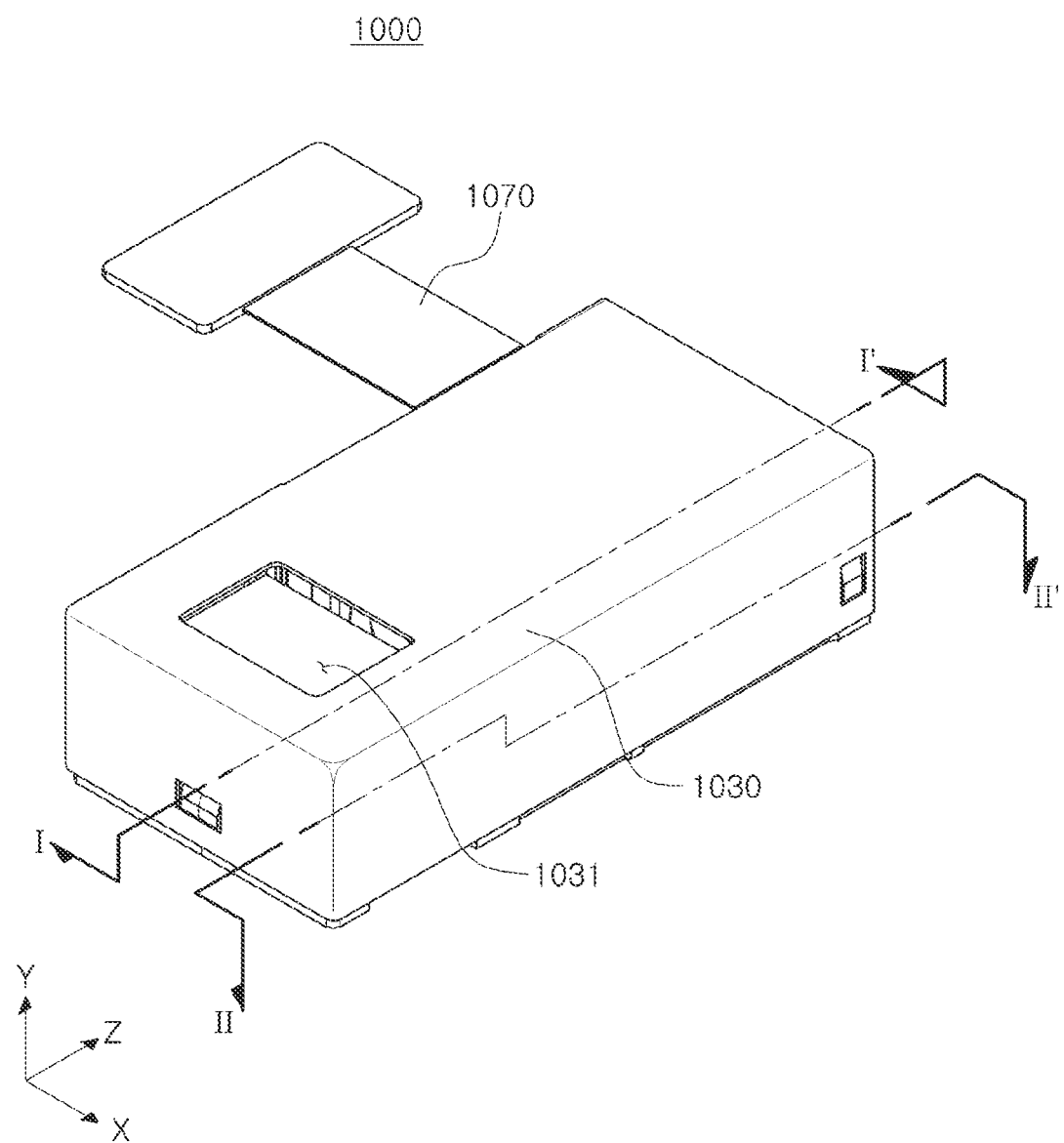
FIG. 2 is a perspective view of a camera module according to an example.
Figure 3A:
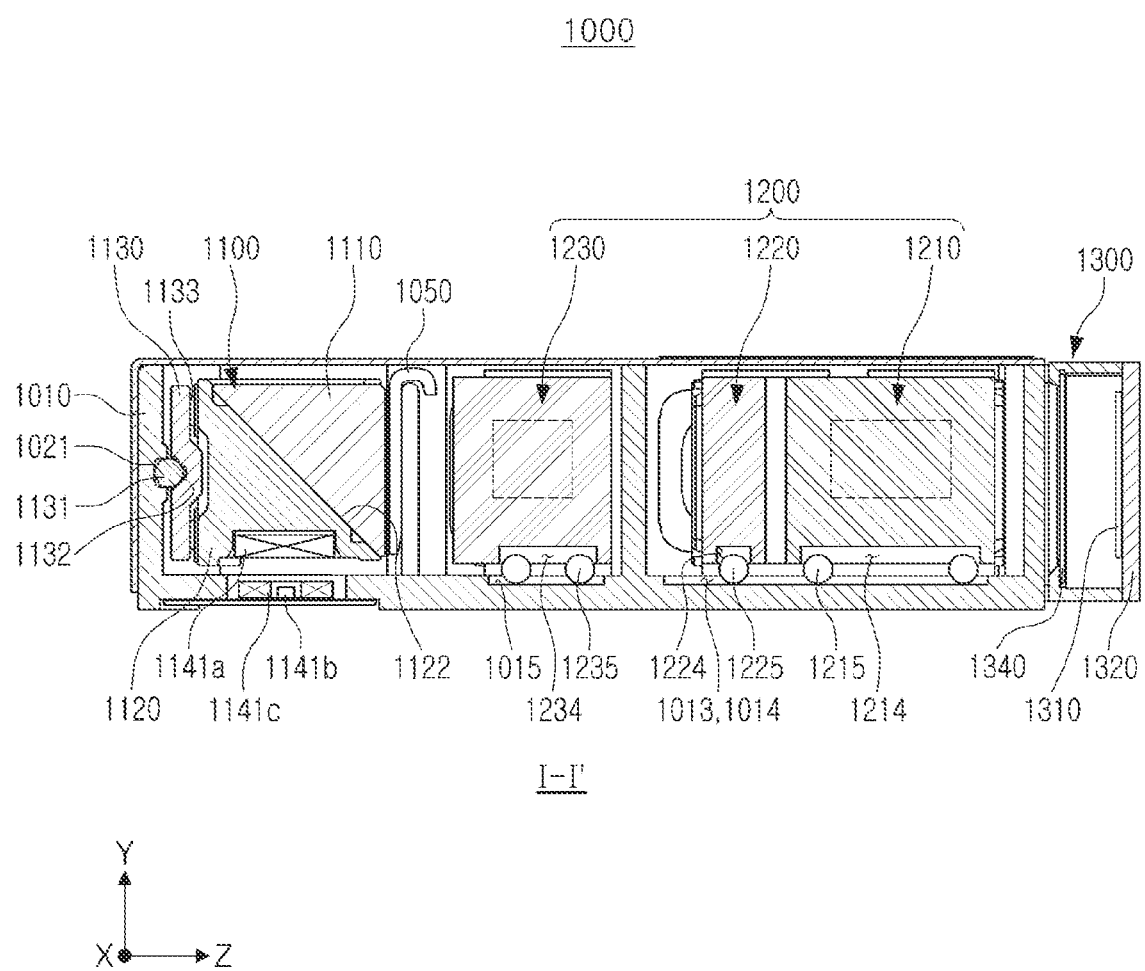
FIGS. 3A and 3B are cross-sectional views of a camera module according to an example.
Figure 3B:
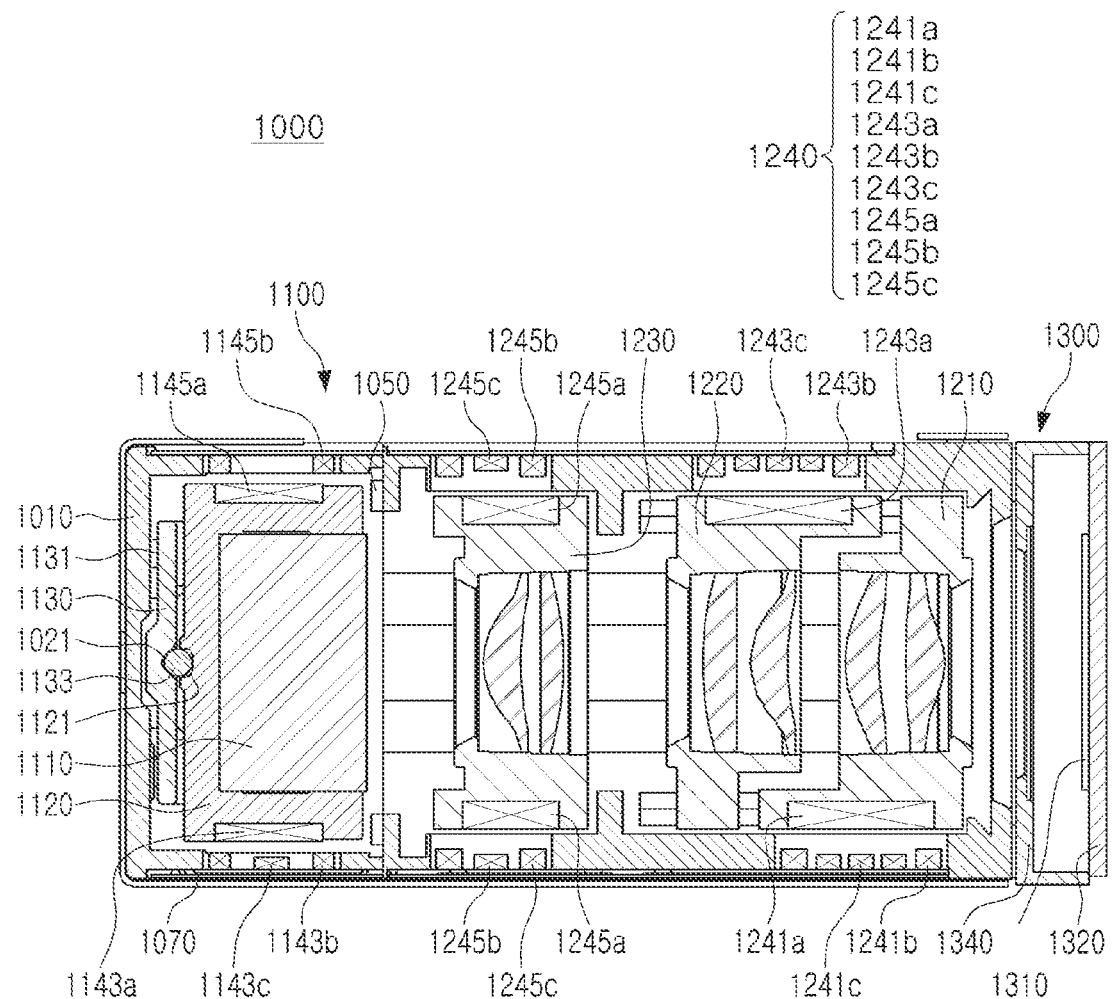
Figure 4:
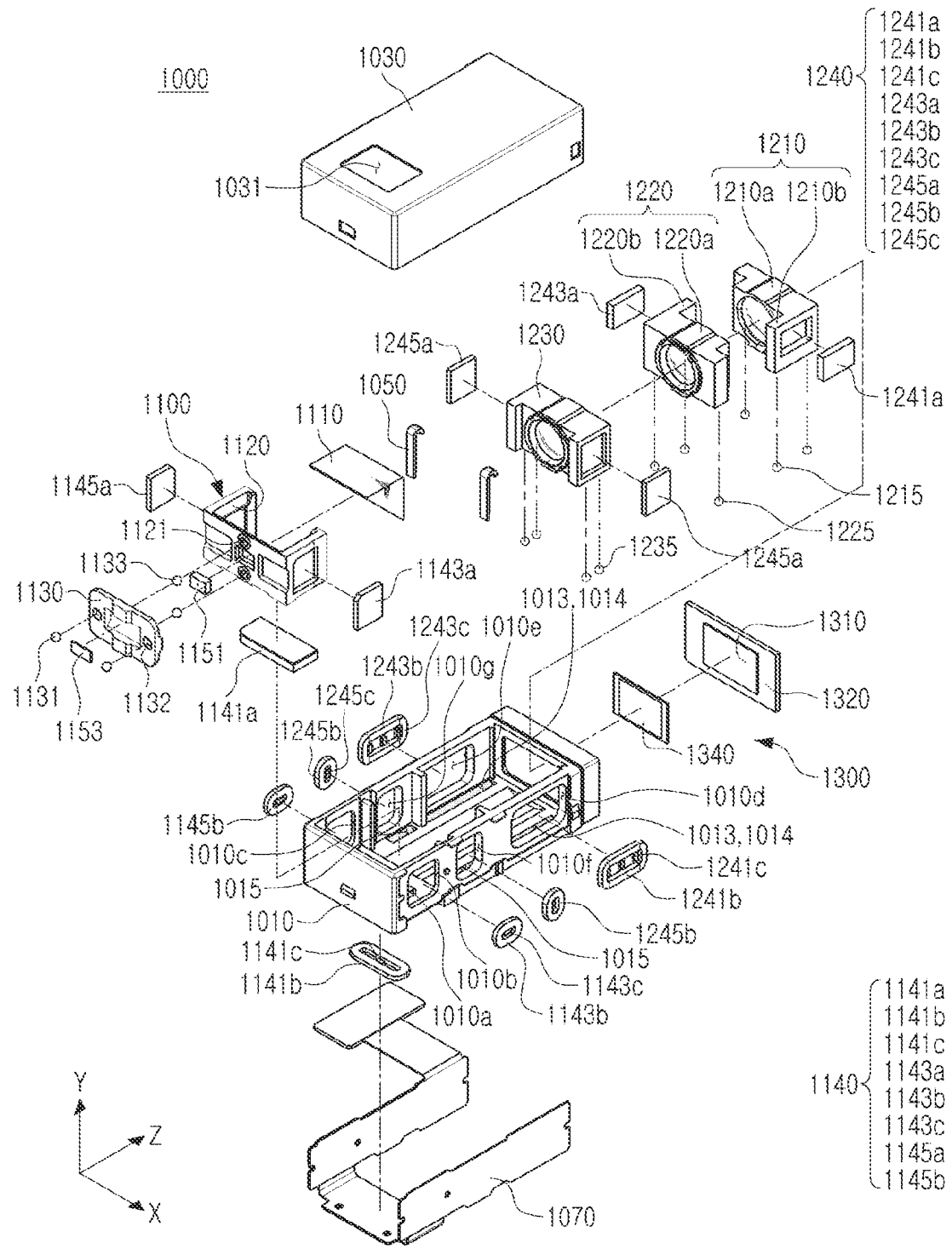
FIG. 4 is an exploded perspective view of a camera module according to an example.
Figure 5:
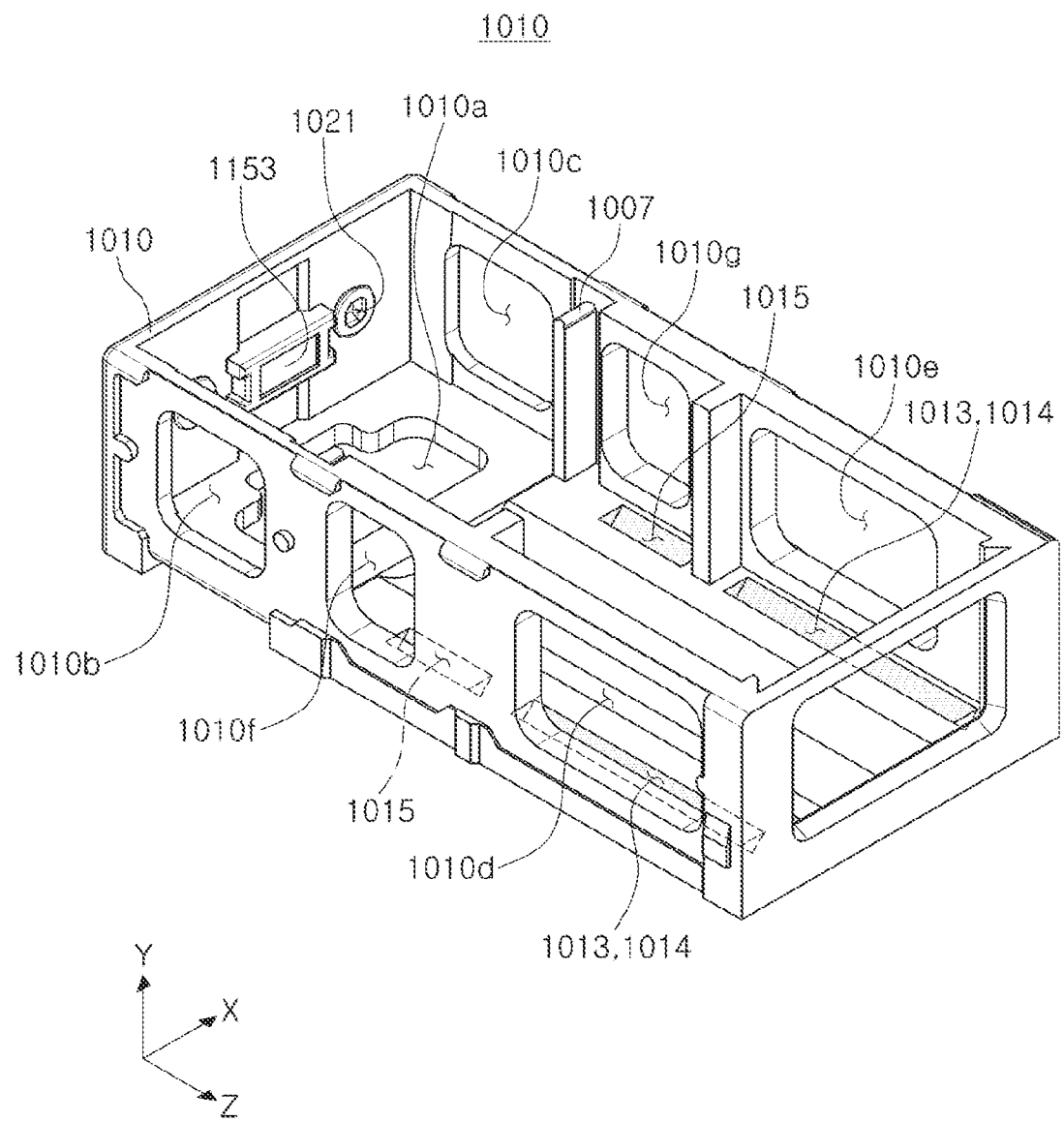
FIG. 5 is an exploded perspective view of a housing of a camera module according to an example.

FIG. 2 is a perspective view of the camera module according to an example, and FIGS. 3A and 3B are cross-sectional views of the camera module according to an example, while FIG. 4 is an exploded perspective view of the camera module according to an example.

Referring to FIGS. 2 to 4, the camera module 1000 includes a reflection module 1100, a lens module 1200 and an image sensor module 1300 provided in a housing 1010.

The reflection module 1100 is configured so as to change a moving direction of light. As an example, a moving direction of light incident through an opening portion 1031 of a cover 1030 covering an upper portion of the camera module 1000 may be changed to a direction toward the lens module 1200 through the reflection module 1100. To this end, the reflection module 1100 may include a reflective member 1110 configured to reflect light.

For example, a path of light incident through the thickness direction (Y-axis direction) of the camera module 1000 is changed by the reflection module 1100 so that the moving direction of the incident light is identical to the optical axis (Z-axis) direction.

The lens module 1200 includes a plurality of lenses through which the light of which the moving direction is changed by the reflection module 1100 passes. The lens module 1200 includes at least three lens barrels 1210, 1220 and 1230. The AF and zoom functions may be implemented according to the movements of the at least three lens barrels 1210, 1220 and 1230 in the optical axis (Z-axis) direction.

The image sensor module 1300 includes an image sensor 1310 converting the light which has passed through the plurality of lenses into an electrical signal and a printed circuit board 1320 on which the image sensor 1310 is mounted. Further, the image sensor module 1300 may include an optical filter 1340 filtering the light incident which has passed through the lens module 1200. The optical filter 1340 may be an infrared cut-off filter.

In the internal space of the housing 1010, the reflection module 1100 is provided in front of the lens module 1200, and the image sensor module 1300 is provided behind the lens module 1200.

Referring to FIGS. 2 to 10, the camera module 1000 includes the reflection module 1100, the lens module 1200, and the image sensor module 1300, which are provided in the housing 1010.

The reflection module 1100, the lens module 1200 and the image sensor module 1300 are sequentially provided from one side to the other side in the housing 1010. The housing 1010 is configured to have an internal space so that all of the reflection module 1100, the lens module 1200, and the image sensor module 1300 can be embedded therein (the printed circuit board 1320 including the image sensor module 1300 may be attached to an outside of the housing 1010).

For example, the housing 1010 may be integrally provided so that the reflection module 1100 and the lens module 1200 are embedded in the internal space thereof. However, it is the configuration not limited thereto, and for example, separate housings in which the reflection module 1100 and the lens module 1200 are respectively embedded may be connected to each other.

The housing 1010 may be covered with the cover 1030 so that the internal space is not shown.

The cover 1030 includes the opening portion 1031 so as that light is incident therethrough, and the moving direction of the light incident through the opening portion 1031 is changed by the reflection module 1100, leading to light incident on the lens module 1200. The cover 1030 may be integrally provided so as to cover the entire housing 1010, or divided into and provided as separate members covering the reflection module 1100 and the lens module 1200, respectively.

The reflection module 1100 includes the reflective member 1110 reflecting light. Further, the light incident on the lens module 1200 passes through the plurality of lens groups (at least three lens barrels 1210, 1220 and 1230) and is converted into an electrical signal by the image sensor 1310 and stored.

The housing 1010 includes the reflection module 1100 and the lens module 1200 in the internal space. In this regard, a space in which the reflection module 1100 is disposed and that in which the lens module 1200 is disposed in the internal space of the housing 1010 may be distinguished from each other by protruding walls 1007. Further, the reflection module 1110 may be provided on a front side of the protruding walls 1007 and the lens module 1200 may be provided on a rear side thereof. The protruding walls 1007 may be configured to protrude from both side walls of the housing 1010 toward the internal space.

In the case of the reflection module 1100 provided on the front side, a rotating holder 1120 is closely adhered to and supported on an inner wall surface of the housing 1010 by attractive force between a pulling yoke 1153 provided on the inner wall surface of the housing 1010 and a pulling magnet 1151 provided on the rotating holder 1120. Although not illustrated in the drawing, the housing 1010 may also be provided with a pulling magnet, and the rotating holder 1120 may also be provided with a pulling yoke. Hereinafter, the structure illustrated in the drawings will be described for convenience of explanation.

First ball bearings 1131, a rotation plate 1130 and second ball bearings 1133 are provided between the inner wall surface of the housing 1010 and the rotating holder 1120.

As the first ball bearings 1131 and the second ball bearings 1133 are partially inserted into guide grooves 1132, 1134, 1021 and 1121, thereby closely adhering thereto, a small space may be required between the rotating holder 1120 and the protruding walls 1007 when the rotating holder 1120 and the rotation plate 1130 are inserted into the internal space of the housing 1010. When the rotating holder 1120 is mounted on the housing 1010, the rotating holder 1120 is closely adhered to the inner wall surface of the housing 1010 by the attractive force between the pulling yoke and the pulling magnet, thereby allowing a small space between the rotating holder 1120 and the protruding walls 1007.

In this regard, stoppers 1050 fitted onto the protruding walls 1007 while supporting the rotating holder 1120 and having a hook shape may be provided (the rotating holder 1120 may be fixed by the attractive force between the pulling magnet 1151 and the pulling yoke 1153 even without the stoppers 1050). Provided in the hook shape, the stoppers 1050 may be provided in a state in which a hook portion thereof is hooked onto an upper part of the protruding walls 1007 so as to face the rotating holder 1120.

The stoppers 1050 may serve as brackets supporting the rotating holder 1120 when the reflection module 1100 is not driven, and may serve to control movements of the rotating holder 1120 when the reflection module 1100 is driven. The stoppers 1050 may be provided on the protruding walls 1007 protruding from the opposite sidewalls, respectively. A space is may be provided between the stoppers 1050 and the rotating holder 1120 so that the rotating holder 1120 smoothly rotates. The stoppers 1050 may be formed of an elastic material so as to allow the rotating holder 1120 to move smoothly while being supported by the stoppers 1050.

The housing 1010 includes a first driving part 1140 and a second driving part 1240 provided to respectively drive the reflection module 1100 and the lens module 1200. The first driving part 1140 includes a plurality of coils 1141*b*, 1143*b* and 1145*b* for driving the reflection module 1100, and the second driving part 1240 includes a plurality of coils 1241*b*, 1243*b* and 1245*b* for driving the lens module 1200, where the lens module 1200 includes the first lens barrel 1210, the second lens barrel 1220 and the third lens barrel 1230.

Further, since the plurality of coils 1141*b*, 1143*b*, 1145*b*, 1241*b*, 1243*b* and 1245*b* are provided in the housing 1010 in a state in which they are mounted on a main board 1070, the housing 1010 may be provided with a plurality of through-holes 1010*a*, 1010*b*, 1010*c*, 1010*d*, 1010*e*, 1010*f* and 1010*g* so that the plurality of coils 1141*b*, 1143*b*, 1145*b*, 1241*b*, 1243*b* and 1245*b* are exposed to the internal space of the housing 1010.

The main board 1070 on which the coils 1141*b*, 1143*b*, 1145*b*, 1241*b*, 1243*b* and 1245*b* are mounted may be provided in a single board as illustrated in the drawings. In this case, a single terminal may be provided, thereby making it easy to connect an external power supply. However, the main board 1070 is not limited to such a configuration, and may also be provided in a plurality of boards by separating a board on which coils for the reflection module 1100 are mounted from a board on which coils for the lens module 1200 are mounted.

The reflection module 1100 may change a path of the light incident through the opening portion 1031. When a still image or a moving image is captured, the still image may be blurred or the moving image may be shaken due to a hand-shake or other movement of a user. In this case, the reflection module 1100 can stabilize the hand-shake or other movement of the user by moving the rotating holder 1120 on which the reflective member 1110 is mounted. For example, when shaking is generated at the time of capturing a still image or a moving image due to a hand-shake or other movement of a user, a relative displacement corresponding to the shaking is provided to the rotating holder 1120 to compensate for the shaking.

The OIS function is implemented by a movement of the rotating holder 1120 having a relatively low weight as it does not include lenses or the like, and thus power consumption for the OIS function can be significantly reduced.

That is, for the OIS function implementation, the moving direction of the light is changed by moving the rotating holder 1120 on which the reflective member 1110 is provided without moving a lens barrel including a plurality of lenses or the image sensor so that the light on which the OIS is performed is incident to the lens module 1200.

The reflection module 1100 includes the rotating holder 1120 provided so as to be supported by the housing 1010, the reflective member 1110 mounted on the rotating holder 1120, and the first driving part 1140 moving the rotating holder 1120.

The reflective member 1110 may change a moving direction of light. For example, the reflective member 1110 may be a mirror or a prism reflecting the light (for convenience of explanation, the reflective member 1110 is illustrated as a prism in the drawings).

The reflective member 1110 is fixed to the rotating holder 1120. The rotating holder 1120 has a mounting surface 1122 on which the reflective member 1110 is mounted.

The mounting surface 1122 of the rotating holder 1120 may be an inclined surface so that a path of light changes. The mounting surface 1123 may be a surface inclined with respect to the optical axis (the Z-axis) of the plurality of the lenses by 30° to 60°. The inclined surface of the rotating holder 1120 may be directed toward the opening portion 1031 of the cover 1030 on which the light is incident.

The rotating holder 1120 on which the reflective member 1110 is mounted is mounted so as to be movable in the internal space of the housing 1010. For example, the rotating holder 1120 may be mounted in the housing 1010 to be rotatable around a first axis (X-axis) and a second axis (Y-axis). The first axis (X-axis) and the second axis (Y-axis) may refer to axes perpendicular to the optical axis (Z-axis), and may be perpendicular to each other.

The rotating holder 1120 is supported in the housing 1010 by the first ball bearings 1131 aligned along the first axis (X-axis) and the second ball bearings 1133 aligned along the second axis (Y-axis) so that the rotating holder 1120 smoothly rotates around the first axis (X-axis) and the second axis (Y-axis). As an example, two first ball bearings 1131 aligned along the first axis (X-axis) and two second ball bearings 1133 aligned along the second axis (Y-axis) are illustrated in the drawings. The rotating holder 1120 may rotate around the first axis (X-axis) and the second axis (Y-axis) by the first driving part 1140, as described below.

Ball bearings individually responsible for the first axis (X-axis) and the second axis (Y-axis) are provided, and thus two of the first ball bearings 1131 aligned along the first axis (X-axis) may be provided in a cylindrical shape extending in the first axis direction (X-axis direction), and two of the second ball bearings 1133 aligned along the second axis (Y-axis) may be provided in a cylindrical shape extending in the second axis direction (Y-axis direction). In this case, the guide grooves 1132, 1134, 1021 and 1121 may be provided in a semi-cylindrical shape so as to correspond to the shapes of the first and second ball bearings 1131 and 1133.

Further, the first ball bearings 1131 and the second ball bearings 1133 are provided on a front surface and a rear surface of the rotation plate 1130, respectively (or alternatively, the first ball bearings 1131 and the second ball bearings 1133 are provided on a rear surface and a front surface of the rotation plate 1130, respectively; that is, the first ball bearings 1131 may be aligned along the second axis (Y-axis) and the second ball bearings 1133 may be aligned along the first axis (X-axis); the structure illustrated in the drawing will hereinafter be described for convenience of explanation). The rotation plate 1130 may be provided between the rotating holder 1120 and an inner surface of the housing 1010.

The rotating holder 1120 may be supported in the housing 1010 via the rotation plate 1130 by the attractive force between the pulling magnet 1151 or the pulling yoke provided on the rotating holder 1120 and the pulling yoke 1153 or the pulling magnet provided on the housing 1010 (the first ball bearings 1131 and the second ball bearings 1133 are also provided between the rotating holder 1120 and the housing 1010).

The guide grooves 1132 and 1134 may be provided on the front surface and the rear surface of the rotation plate 1130 such that the first ball bearings 1131 and the second ball bearings 1133 are inserted. The guide grooves 1132 and 1134 may include first guide grooves 1132 into which the first ball bearings 1131 are partially inserted and second guide grooves 1134 into which the second ball bearings 1133 are partially inserted.

The housing 1010 may be provided with third guide grooves 1021 into which the first ball bearings 1131 are partially inserted, and the rotating holder 1120 may be provided with fourth guide grooves 1121 into which the second ball bearings 1133 are partially inserted.

The first guide grooves 1132, the second guide grooves 1134, the third guide grooves 1021, and the fourth guide grooves 1121 described above may be provided in a hemispherical or polygonal (polyprismatic or polypyramidal) groove shape so that the first ball bearings 1131 and the second ball bearings 1133 can easily rotate.

The first ball bearings 1131 and the second ball bearings 1133 may serve as bearings while rolling or sliding on the first guide grooves 1132, the second guide grooves 1134, the third guide grooves 1021 and the fourth guide grooves 1121.

The first ball bearings 1131 and the second ball bearings 1133 may have a structure in which they are fixedly provided in at least one of the housing 1010, the rotation plate 1130 and the rotating holder 1120. For example, the first ball bearings 1131 may be fixedly provided in the housing 1010 or on the rotation plate 1130, and the second ball bearings 1133 may be fixedly provided on the rotation plate 1130 or the rotating holder 1120.

In this case, only a member facing a member in which the first ball bearings 1131 or the second ball bearings 1133 are fixedly provided may be provided with the guide grooves, and the ball bearings may serve as friction bearings by sliding rather than rotating.

When the first ball bearings 1131 and the second ball bearings 1133 are fixedly provided in any one of the housing 1010, the rotation plate 1130 and the rotating holder 1120, the first ball bearings 1131 and the second ball bearings 1133 may be provided in a spherical or hemispherical shape or a round projection shape.

Further, the first ball bearings 1131 and the second ball bearings 1133 may be separately manufactured and then attached to any one of the housing 1010, the rotation plate 1130 and the rotating holder 1120. Alternatively, the first ball bearings 1131 and the second ball bearings 1133 may be provided integrally with the housing 1010, the rotation plate 1130 or the rotating holder 1120 at the time of manufacturing the housing 1010, the rotation plate 1130 or the rotating holder 1120.

The first driving part 1140 generates a driving force so that the rotating holder 1120 is rotatable around the two axes.

As an example, the first driving part 1140 may include a plurality of magnets 1141a, 1143a and 1145a, and the plurality of coils 1141b, 1143b and 1145b may be arranged to face the plurality of magnets 1141a, 1143a and 1145a, respectively.

When power is applied to the plurality of coils 1141b, 1143b and 1145b, the rotating holder 1120 on which the magnets 1141a, 1143a and 1145a are mounted may be rotated around the first axis (X-axis) and the second axis (Y-axis) by an electromagnetic effect between the plurality of magnets 1141a, 1143a and 1145a and the plurality of coils 1141b, 1143b and 1145b.

The plurality of magnets 1141a, 1143a and 1145a are mounted on the rotating holder 1120. As an example, the magnet 1141a may be mounted on a lower surface of the rotating holder 1120, and the remaining magnets 1143a and 1145a may be mounted on side surfaces of the rotating holder 1120.

The plurality of coils 1141b, 1143b and 1145b are mounted on the housing 1010. As an example, the plurality of coils 1141b, 1143b and 1145b may be mounted on the housing 1010 through the main board 1070. The plurality of coils 1141b, 1143b and 1145b are provided on the main board 1070, while the main board 1070 is mounted on the housing 1010.

In the drawings, an example in which the main board 1070 is integrally provided so that both the coils for the reflection module 1100 and those for the lens module 1200 are mounted thereon is illustrated. However, the main board 1070 may be provided as at least two separate boards on which the coils for the reflection module 1100 and the coils for the lens module 1200 are mounted, respectively.

A closed loop control method involving sensing a position of the rotating holder 1120 and providing feedback is used when rotating the rotating holder 1120.

Accordingly, position sensors 1141*c* and 1143*c* are required for the closed loop control. The position sensors 1141*c* and 1143*c* may be Hall sensors.

The position sensors 1141*c* and 1143*c* are disposed inside or outside of the coils 1141*b* and 1143*b*, respectively, and may be mounted on the main board 1070 on which each of the coils 1141*b* and 1143*b* is mounted.

The main board 1070 may be provided with a gyro sensor (not illustrated) sensing a shaking factor such as a handshake or other movement of the user, and may be provided with a driver integrated circuit (IC; not illustrated) providing a driving signal to the plurality of coils 1141*b*, 1143*b* and 1145*b*.

When the rotating holder 1120 rotates around the first axis (X-axis), the rotation plate 1130 rotates around the first ball bearings 1131 arranged along the first axis (X-axis), which makes the rotating holder 1120 rotate as well. In this case, the rotating holder 1120 does not move relative to the rotation plate 1130.

Further, when the rotating holder 1120 rotates around the second axis (Y-axis), the rotating holder 1120 rotates around the second ball bearings 1133 arranged along the second axis (Y-axis) along the second axis (Y-axis). In this case, the rotation plate 1130 does not rotate, and the rotating holder 1120 thus moves relative to the rotation plate 1130.

That is, when the rotating holder 1120 rotates around the first axis (X-axis), the first ball bearings 1131 operate, and when the rotating holder 1120 rotates around the second axis (Y-axis), the second ball bearings 1133 operate. This is because, as illustrated in the drawings, the second ball bearings 1133 aligned along the second axis (Y-axis) cannot move while being fitted into the guide grooves when the rotating holder 1120 rotates around the first axis (X-axis), and the first ball bearings 1131 aligned along the first axis (X-axis) cannot move while being fitted into the guide grooves when the rotating holder 1120 rotates around the second axis (Y-axis).

The light which has reflected on the reflection module 1100 may be incident on the lens module 1200. Therefore, optical axes of the stacked lenses provided in the lens module 1200 are aligned in the Z-axis direction, a direction in which the light is emitted from the reflection module 1100.

Figure 6A:
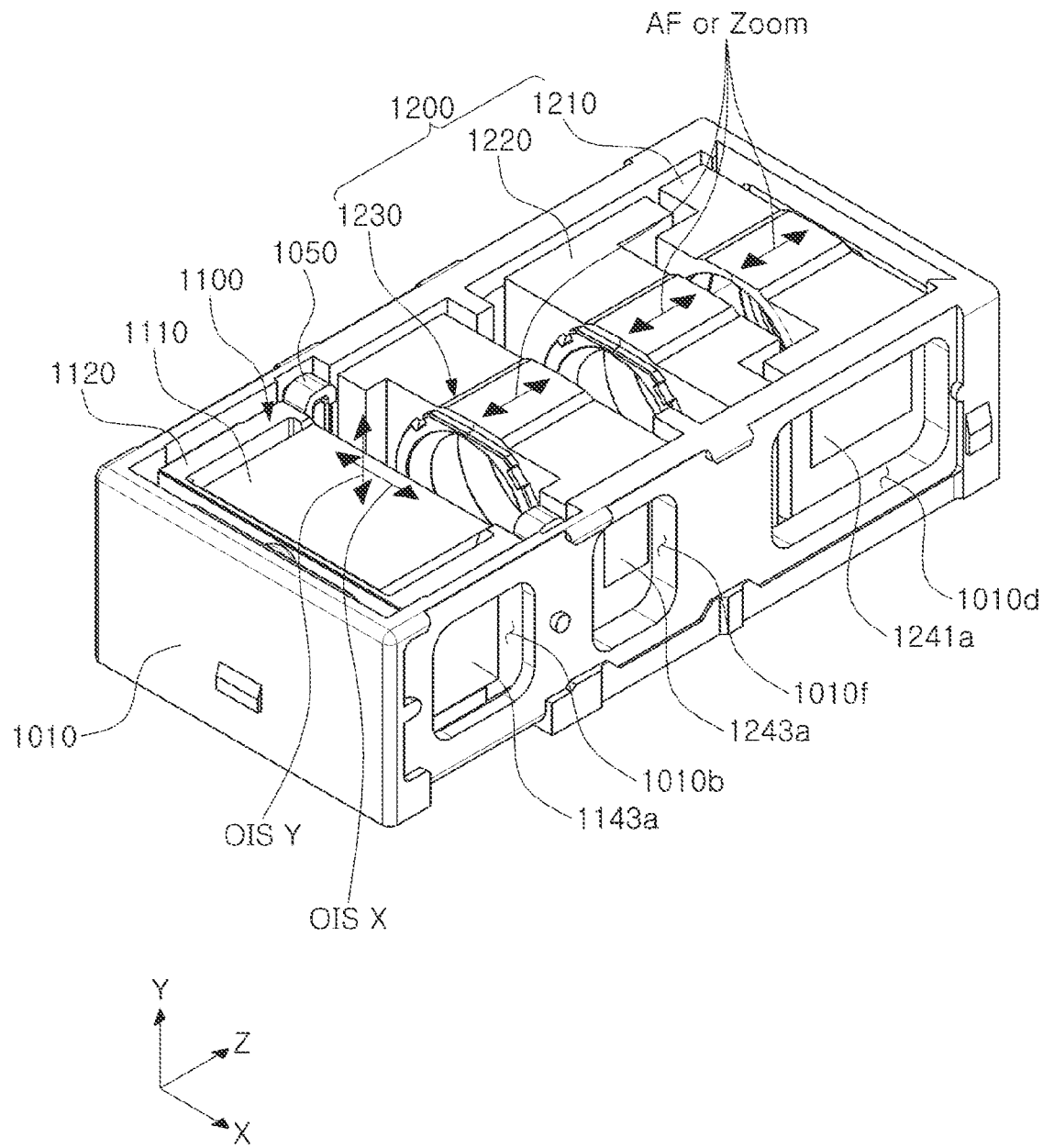
FIGS. 6A and 6B are perspective views of a reflection module and a lens module coupled to the housing of a camera module according to an example.

Referring to FIG. 6A, the two lens barrels 1210 and 1220 at the rear are responsible for the zoom function, and the lens barrel 1230 at the front may be responsible for the AF function. Further, the three lens barrels 1210, 1220 and 1230 may be responsible for the zoom and AF functions in various combinations.

Figure 6B:
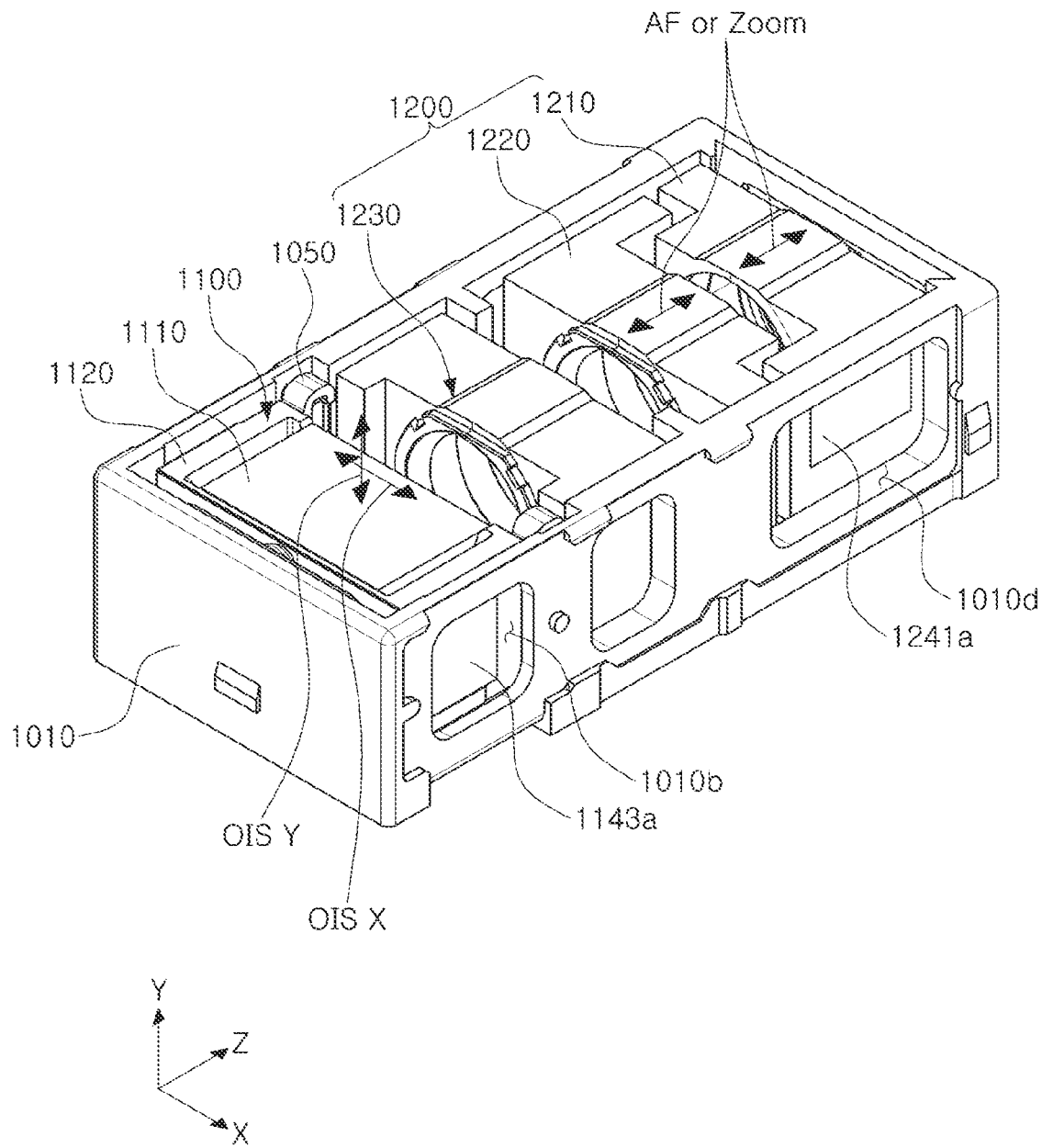
Figure 7:
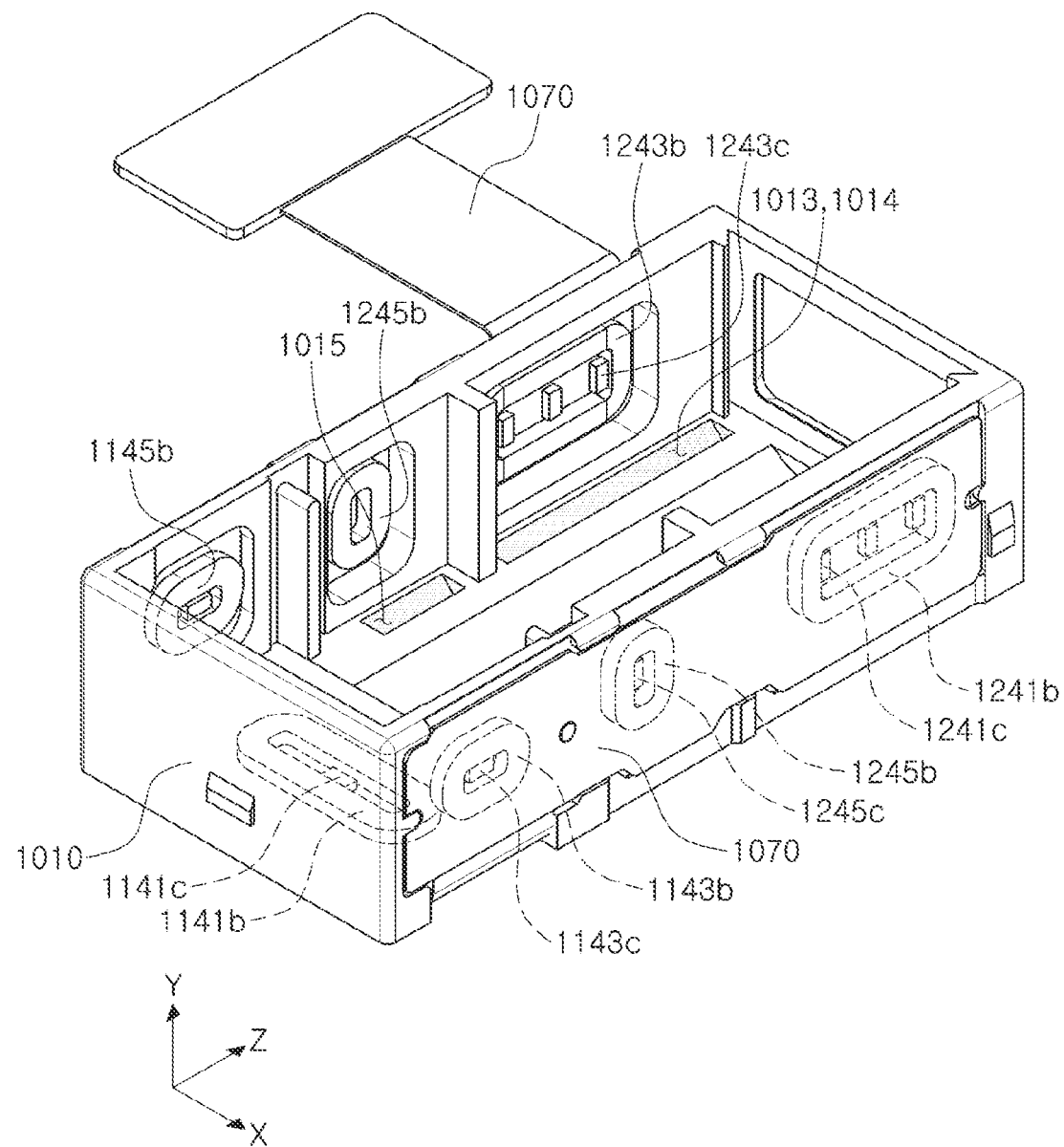
FIG. 7 is a perspective view of a board having driving coils and sensors mounted thereon, coupled to the housing of a camera module according to an example.
Figure 8:
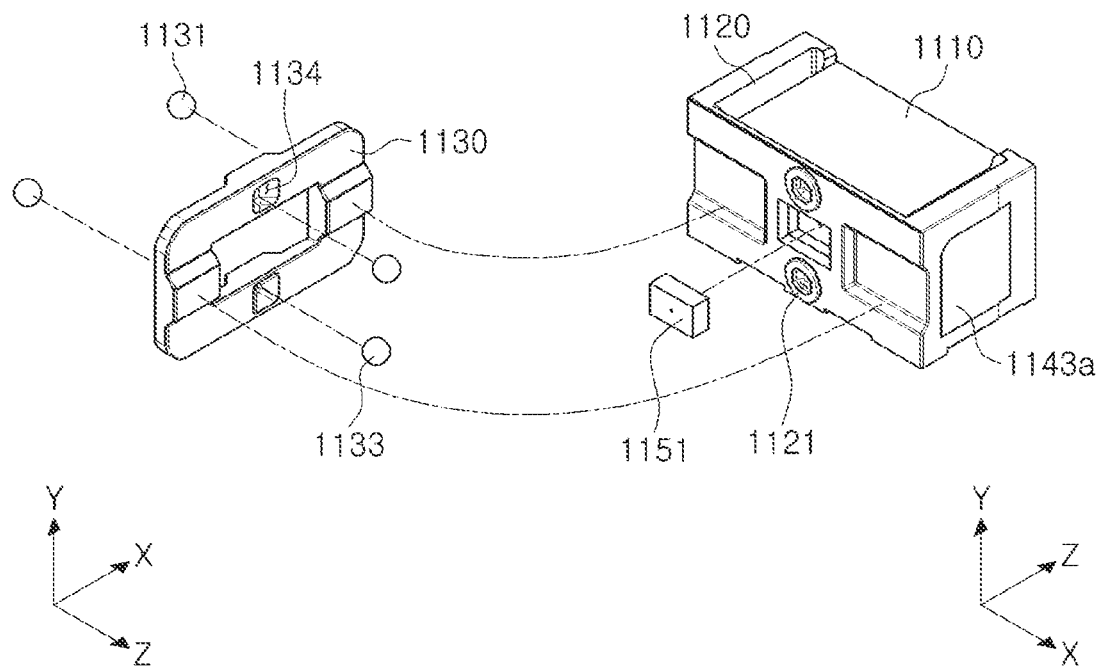
FIG. 8 is an exploded perspective view of a rotating plate and a rotating holder in a camera module according to an example.
Figure 9:
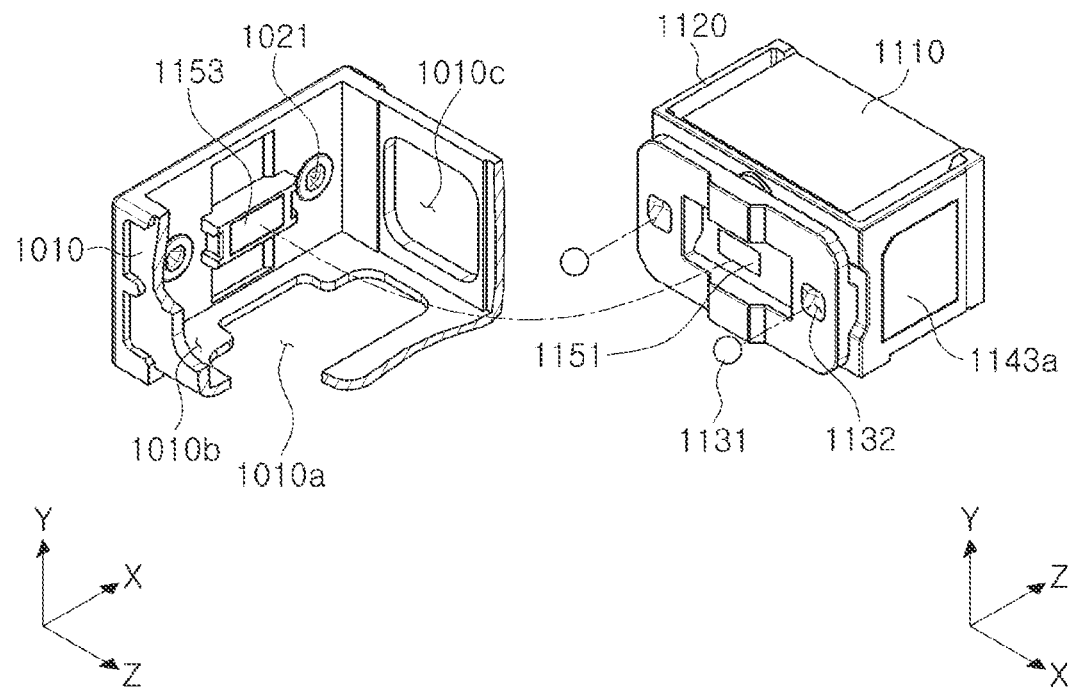
FIG. 9 is an exploded perspective view of the housing and the rotating holder in a camera module according to an example.
Figure 10:
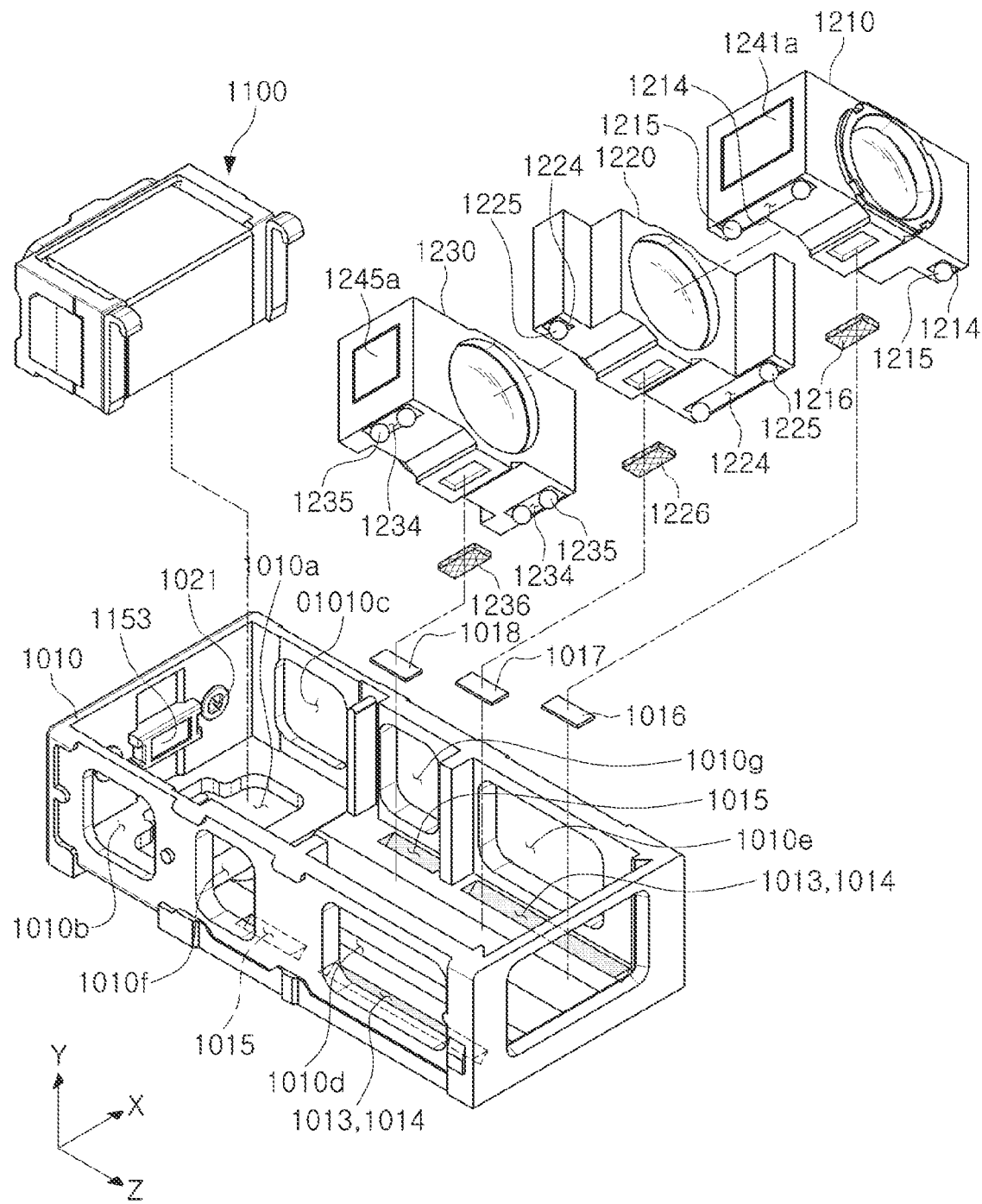
FIG. 10 is an exploded perspective view of a housing and a lens barrel according to an example.

Various deformations may be additionally controlled. Referring to FIG. 6B, for example, the rear two lens barrels 1210 and 1220, individually or in common, perform the zoom or AF function, where, for example, the two lens barrels 1210 and 1220 combine to perform the zoom function, and the lens barrel 1210 at the rearmost is further responsible for the AF function, and the front lens barrel 1230 may remain fixed to the housing 1010. Further, although not illustrated in the drawings, any one of the three lens barrels 1210, 1220 and 1230 may remain fixed to the housing 1010 while the remaining two lens barrels may be responsible for the zoom or AF function, individually or in common. In this case, the lens barrel (for example, lens barrel 1230) fixed to the housing 1010 does not require ball bearings or the like interposed between a driving magnet or a coil facing thereto and the housing 1010.

In addition, the housing is configured to include a space in which the one front lens barrel 1230 and two rear lens barrels 1210 and 1220 is partitioned, but is not limited to such a configuration. The three lens barrels 1210, 1220 and 1230 may be provided in a same space or partitioned separate spaces.

The plurality of laminated lens groups provided in the lens module 1200 may be divided into at least three lens barrels 1210, 1220 and 1230, respectively. Even when the plurality of laminated lens groups is divided and provided in at least three lens barrels 1210, 1220 and 1230, the optical axis is aligned in the Z-axis, a direction in which light is emitted from the reflection module 1100.

The lens module 1220 includes the second driving part 1240 to implement the AF and zoom functions.

The lens modules include at least three lens barrels, the first lens barrel 1210, the second lens barrel 1220, and the third lens barrel 1230, in the internal space of the housing 1010, and include the second driving part 1240 moving the three lens barrels 1210, 1220 and 1230 in the optical axis (Z-axis) direction with respect to the housing 1010.

The first to third lens barrels 1210, 1220 and 1230 are configured to move approximately in the optical axis (Z-axis) direction for the AF or zoom function.

In this regard, the second driving part 1240 generates a driving force to move the first to third lens barrels 1210, 1220 and 1230 in the optical axis (Z-axis) direction. That is, the second driving part 1240 enables the implementation of the AF or zoom function by moving the first to third lens barrels 1210, 1220 and 1230 individually in the optical axis (Z-axis) direction.

The first to third lens modules 1210, 1220 and 1230 may be configured to be supported on the bottom surface of the housing 1010. For example, the first to third lens barrels 1210, 1220 and 1230 may be individually supported by ball bearings on the bottom surface of the housing 1010. Hereinafter, an example in which the first to third lens barrels 1210, 1220 and 1230 are individually supported by ball bearings on the bottom surface of the housing 1010 will be mainly described.

As an example, the second driving part 1240 includes a plurality of magnets 1241*a*, 1243*a* and 1245*a*, and the plurality of coils 1241*b*, 1243*b* and 1245*b* disposed to face the magnets 1241*a*, 1243*a* and 1245*a*, respectively.

When power is applied to the coils 1241*b*, 1243*b* and 1245*b*, the first to third lens barrels 1210, 1220 and 1230 on which the magnets 1241*a*, 1243*a* and 1245*a* are separately mounted may be moved in the optical axis (Z-axis) direction by an electromagnetic effect between the magnets 1241*a*, 1243*a* and 1245*a* and the coils 1241*b*, 1243*b* and 1245*b*.

The plurality of magnets 1241*a*, 1243*a* and 1245*a* are separately mounted on the first to third lens barrels 1210, 1220 and 1230. As an example, the first magnet 1241*a* may be mounted on a side surface of the first lens barrel 1210, and the second magnet 1243*a* may be mounted on a side surface of the second lens barrel 1220, while the third magnet 1245*a* may be mounted on a side surface of the third lens barrel 1230.

The plurality of coils 1241*b*, 1243*b* and 1245*b* are mounted on the housing 1010 so as to face the plurality of magnets 1241*a*, 1243*a* and 1245*a*, respectively. As the plurality of magnets 1241*a*, 1243*a* and 1245*a* are provided on both side surfaces of the first to third lens barrels 1210, 1220 and 1230, and the plurality of coils 1241*b*, 1243*b* and 1245*b* may be provided on both sidewalls so as to face each other.

As an example, the main board 1070 may be mounted on the housing 1010, while having the plurality of coils 1241*b*, 1243*b* and 1245*b* mounted thereon.

A closed loop control method involving sensing positions of the first to third lens barrels 1210, 1220 and 1230 and providing feedback is used when moving the first to third lens barrels 1210, 1220 and 1230. Accordingly, position sensors 1241c, 1243c and 1245c are required for the closed loop control. The position sensors 1241c, 1243c and 1245c may be Hall sensors.

The position sensors 1241c, 1243c and 1245c are disposed inside or outside of the coils 1241b, 1243b and 1245b, respectively, and may be mounted on the main board 1070 on which each of the coils 1241b, 1243b and 1245b is mounted.

The first lens barrel 1210 and the second lens barrel 1220 are driven by a pair of coils and magnets. In this case, coils and magnets may be provided on any one side. The coils and the magnets may have somewhat increased sizes to enhance the driving force. In such case, a plurality of position sensors 1241c and 1243c may be provided for accurate position sensing. In the drawings, three position sensors 1241c and 1243c are provided inside each of the coils 1241b and 1243b driving the first lens barrel 1210 and the second lens barrel 1220.

The first lens barrel 1210 is provided in the housing 1010 so as to be movable in the optical axis (Z-axis) direction. As an example, a plurality of third ball bearings 1215 are disposed between the first lens barrel 1210 and the bottom surface of the housing 1010.

The plurality of third ball bearings 1215 serve as bearings guiding movements of the first lens barrel 1210 in a process of implementing the AF and zoom functions.

The plurality of third ball bearings 1215 are configured to roll in the optical axis (Z-axis) direction when a driving force moving the first lens barrel 1210 in the optical axis (Z-axis) direction is generated. Accordingly, the plurality of third ball bearings 1215 guide the movement of the first lens barrel 1210 in the optical axis (Z-axis) direction.

A plurality of guide grooves 1214 and 1013 accommodating the third ball bearings 1215 therein are formed on the bottom surface of the housing 1010 facing the first lens barrel 1210, and some of the guide grooves 1214 and 1013 may be elongated in the optical axis (Z-axis) direction.

The third ball bearings 1215 are accommodated in the guide grooves 1214 and 1013 and are inserted to fit between the first lens barrel 1210 and the housing 1010.

Some or all of the guide grooves 1214 and 1013 may be elongated in the optical axis (Z-axis) direction. Further, cross sections of the guide grooves 1214 and 1013 may have various shapes, such as a rounded shape and a polygonal shape.

The first lens barrel 1210 is pressed toward the bottom of the housing 1010 so that the plurality of third ball bearings 1215 can remain in contact with the first lens barrel 1210 and the housing 1010. To this end, a pulling yoke 1016 may be mounted on the bottom surface of the housing 1010 so as to face a pulling magnet 1216 mounted on the lower surface of the first lens barrel 1210. The pulling yoke 1016 may be formed of a magnetic material. A pulling magnet may be mounted on a bottom surface of the housing 1010, and a pulling yoke may be mounted on a lower surface of the first lens barrel 1210.

The coil 1241b driving the first lens barrel 1210 is provided on one side surface of the housing 1010. In this case, the electromagnetic force acts on one side surface of the first lens barrel 1210, and thus the pulling magnet 1216 and the pulling yoke 1016 may be biased toward one side surface from the center of the housing 1010 in order to facilitate the driving of the first lens barrel 1210. The first lens barrel 1210 may be provided with a magnet-mounting portion extending to a side surface of the second lens barrel 1220 in the optical axis direction in order to increase the size of the magnet 1241a to enhance the driving force. Further, in order to increase the size of the magnet 1243a for an enhanced driving force, the second lens barrel 1220 may be provided with a magnet-mounting portion extending to a side surface of the first lens barrel 1210 in the optical axis direction.

The coil 1243b driving the second lens barrel 1220 is provided on the other side surface, which is an opposite side surface of the one side surface of the housing 1010 on which the coil 1241b is provided. In this case, as an electromagnetic force is applied to the other side surface of the second lens barrel 1220, a pulling magnet 1226 and a pulling yoke 1017 may be biased toward the other side surface from the center of the housing 1010 in order to facilitate the driving of the second lens barrel 1220.

Further, the coil 1245b driving the third lens barrel 1230 may be provided on both side surfaces or one side surface of the housing 1010. When the coil 1245b is provided on only one side of the housing 1010, a pulling magnet 1236 and a pulling yoke 1018 may be biased toward one side surface from the center of the housing 1010 in order to facilitate the driving of the third lens barrel 1230, similarly to the first and second lens barrels 1210 and 1220. However, this refers to a case where the coils driving the lens barrels 1210, 1220 and 1230 are provided on only one side surface of the one side surface and the other side surface. When the coils are provided on both side surfaces, a pulling magnet and a pulling yoke may be provided approximately at the center.

The second lens barrel 1220 is disposed in the housing 1010 to be movable in the optical axis (Z-axis) direction. As an example, the second lens barrel 1220 may be disposed in parallel with the first lens barrel 1210 in the optical axis direction in front of the first lens barrel 1210.

A plurality of fourth ball bearings 1225 are disposed between the second lens barrel 1220 and the bottom surface of the housing 1010, and the second lens barrel 1220 may be slid or rolled with respect to the housing 1010 by the fourth ball bearings 1225.

The plurality of fourth ball bearings 1225 are configured to assist in a rolling or sliding motion of the second lens barrel 1220 in the optical axis direction (the Z-axis direction) when a driving force is generated so that the second lens barrel 1220 moves in the optical axis (Z-axis) direction.

A plurality of guide grooves 1224 and 1014 accommodating the fourth ball bearings 1225 therein are formed on a facing bottom surface of the second lens barrel 1220 and the housing 1010, and some of the guide grooves may be elongated in the optical axis (Z-axis) direction.

The plurality of fourth ball bearings 1225 are accommodated in the guide grooves 1224 and 1014 and are inserted to fit between the second lens barrel 1220 and the housing 1010.

Each of the plurality of guide grooves 1224 and 1014 may be elongated in the optical axis (Z-axis) direction. Further, cross sections of the guide grooves 1224 and 1014 may be in various shapes such as a round shape and a polygonal shape.

The second lens barrel 1220 is pressed toward the bottom surface of the housing 1010 so that the fourth ball bearings 1225 can remain in contact with the second lens barrel 1220 and the housing 1010.

To this end, the pulling yoke 1017 may be mounted on the bottom surface of the housing 1010 so as to face the pulling magnet 1226 mounted on the second lens barrel 1220. The pulling yoke 1017 may be a magnetic material. A pulling magnet may be mounted on a bottom surface of the housing 1010, and a pulling yoke may be mounted on a lower surface of the second lens barrel 1220.

First and second lens barrels 1210 and 1220 may have approximately the same length in the optical axis direction. The first and second lens barrels 1210 and 1220 may respectively include first and second lens seating portions 1210*a* and 1220*a* each provided with a lens array, and first and second extending portions 1210*b* and 1220*b* each extending from the first and second lens seating portions 1210*a* and 1220*a* in the optical axis direction.

The first and second lens barrels 1210 and 1220 may respectively include the first and second magnets 1241*a* and 1243*a* in the first and second extending portions 1210*b* and 1220*b*.

The third lens barrel 1230 is disposed in the housing 1010 to be movable in the optical axis (Z-axis) direction. As an example, the third lens barrel 1230 may be disposed in parallel with the second lens barrel 1220 in the optical axis direction in front of the second lens barrel 1220.

A plurality of fifth ball bearings 1235 are disposed between the third lens barrel 1230 and the bottom surface of the housing 1010, and the third lens barrel 1230 may be slid or rolled with respect to the housing 1010 by the fifth ball bearings 1235.

The plurality of fifth ball bearings 1235 are configured to assist in a rolling or sliding motion of the third lens barrel 1230 in the optical axis direction (the Z-axis direction) when a driving force is generated so that the third lens barrel 1230 moves in the optical axis (Z-axis) direction.

A plurality of guide grooves 1234 and 1015 accommodating the fifth ball bearings 1235 therein are formed on a facing bottom surface of the third lens barrel 1230 and the housing 1010, and some of the guide grooves may be elongated in the optical axis (Z-axis) direction.

The plurality of fifth ball bearings 1235 are accommodated in the guide grooves 1234 and 1015 and are inserted to fit between the third lens barrel 1230 and the housing 1010.

Each of the plurality of guide grooves 1234 and 1015 may be elongated in the optical axis (Z-axis) direction. Further, cross sections of the guide grooves 1234 and 1015 may be in various shapes such as a round shape and a polygonal shape.

The third lens barrel 1230 is pressed toward the bottom surface of the housing 1010 so that the fifth ball bearings 1235 can remain in contact with the third lens barrel 1230 and the housing 1010.

To this end, the pulling yoke 1018 may be mounted on the bottom surface of the housing 1010 so as to face the pulling magnet 1236 mounted on the third lens barrel 1230. The pulling yoke 1018 may be a magnetic material. A pulling magnet may be mounted on a bottom surface of the housing 1010, and a pulling yoke may be mounted on a lower surface of the third lens barrel 1230.

Guide grooves 1013, 1014 and 1015 provided in the housing 1010 to guide the movements of the third to fifth ball bearings 1215, 1225 and 1235 each may have a long groove shape extending in the optical axis direction, or be a guide groove in which at least two of the guide grooves are mutually connected to each other. In the case of the guide groove in which at least two of the guide grooves 1013, 1014 and 1015 are interconnected, the first to third lens barrels 1210, 1220 and 1230 may be easily aligned in the optical axis direction.

An example in which the guide groves 1013 and 1014 provided in moving paths of the first and second lens barrels 1210 and 1220 are provided as a single guide groove in which they are connected to each other and the third lens barrel 1230 is separately provided, is illustrated. Although not limited thereto, the guide grooves may be provided in the form in which only the guide grooves 1014 and 1015 used for the movements of the second and third lens barrels 1210 and 1220 are connected to each other or in which all the guide grooves 1013, 1014 and 1015 are connected.

The first to third lens barrels 1210, 1220 and 1230 are sequentially provided in the optical axis direction, and the first and second lens barrels 1210 and 1220 has the coils 1241*b* and 1243*b* and the magnets 1241*a* and 1243*a* on one side or the other side. The third lens barrel 1230 may be provided with the coil 1245*b* and the magnet 1245*a* on both sides.

Although not limited to such a configuration, the coil 1245*b* and the magnet 1245*a* may be provided only on the one side of the third lens barrel 1230 that corresponds to the side of the first lens barrel 1210 on which the coil 1241*b* and magnet 1241*a* are mounted. This is to arrange the coil 1245*b* and the magnet 1245*a* provided in the third lens barrel 1230 as far as possible so as not to be affected by the driving parts 1243*b* and 1243*a* of the second lens barrel 1220 adjacent thereto.

Figure 11:
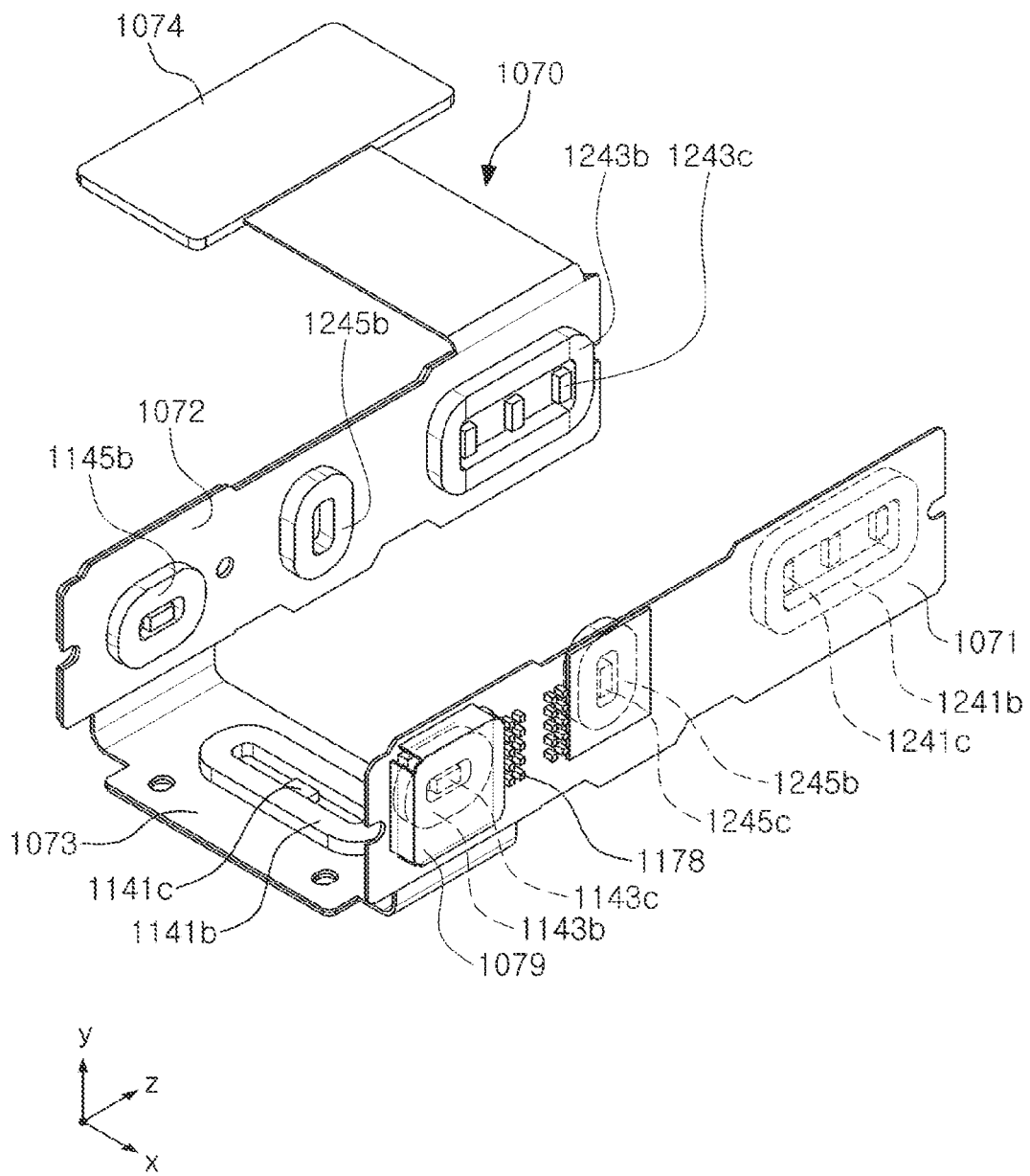
FIG. 11 is a perspective view of a main board according to an embodiment and coils and components mounted thereon.

FIG. 11 is a perspective view of a main board according to an example and coils and components mounted thereon.

Referring to FIG. 11, the coils 1141*b*, 1143*b* and 1145*b* of the first driving part 1140 for driving the reflection module 1100 and the plurality of coils 1241*b*, 1243*b* and 1245*b* of the second driving part 1240 for driving the lens module 1200 may be mounted on an inner surface of the main board 1070. Further, a component 1178 such as a passive element, an active element, or the like, a gyro sensor 1079 and the like, may be mounted on an outer surface of the main board 1070. Accordingly, the main board 1070 may be double-sided.

Specifically, the main board 1070 may include first and second side boards 1071 and 1072 disposed approximately in parallel to each other, and a bottom board 1073 mutually connecting the first and second side boards 1071 and 1072. A terminal portion 1074 for external power and signal connection may be connected to any one of the first and second side boards 1071 and 1072 and the bottom board 1073.

Some (1143*b*) of the plurality of coils of the first driving part 1140 for driving the reflection module 1110 and a sensor 1143*c*, and some (1241*b*) of the plurality of coils of the second driving part 1240 for driving the lens module 1200 and a sensor 1241*c* may be mounted on the first side board 1071.

Some (1145*b*) of the plurality of coils of the first driving part 1140 for driving the reflection module 1110, and some (1243*b*) of the plurality of coils of the second driving part 1240 for driving the lens module 1200 and sensors 1243*c* may be mounted on the second side board 1072.

The coil 1141*b* of the first driving part 1140 for driving the reflection module 1110 and the sensor 1141*c* sensing the position of the reflection module 1100 may be mounted on the bottom board 1073.

Although the first side board 1071 is illustrated in the drawing to have components 1178 such as various passive elements and active elements, the gyro sensor 1079, and the like, mounted thereon, the components 1178, the gyro sensor 1079, and the like may be mounted on the second side board 1072 or suitably divided and mounted on the first and second side boards 1071 and 1072.

Further, the plurality of coils 1141*b*, 1143*b*, 1145*b*, 1241*b*, 1243*b* and 1245*b* as well as the position-sensing sensors 1141*c*, 1143*c*, 1241*c*, 1243*c* and 1245*c*, which are mounted on the first side board 1071, the second side board 1072 and the bottom board 1073, may be variously divided and mounted on each board according to design of a camera module.

Figure 12:
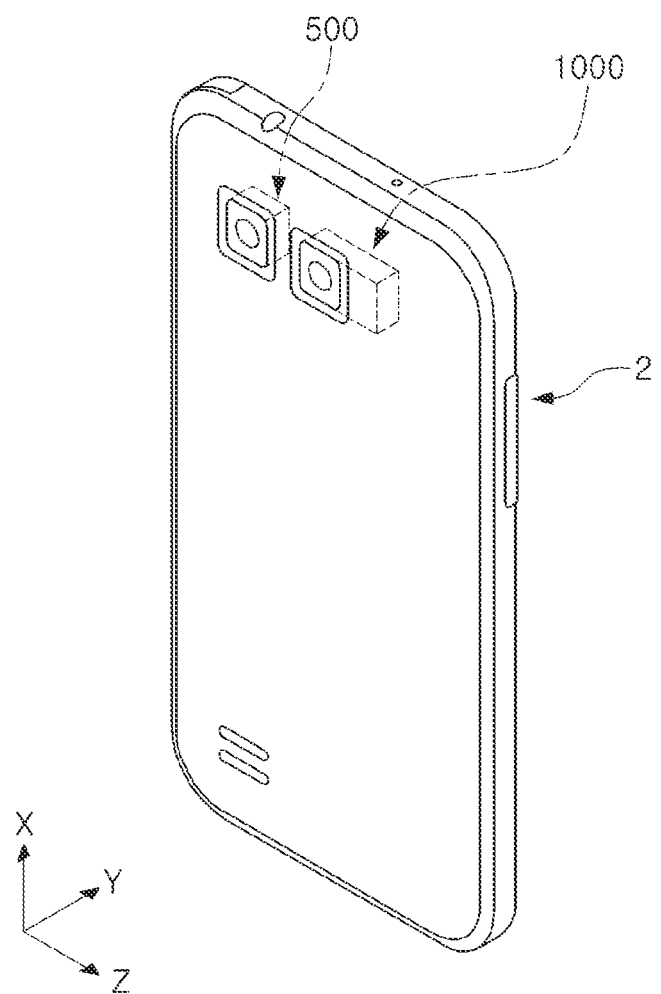
FIG. 12 is a perspective view of a portable electronic device according to an example.

FIG. 12 is a perspective view of a portable electronic device according to an example.

Referring to FIG. 12, a portable electronic device 2 may be a portable electronic device mounted with a plurality of camera modules 500 and 1000, such as a mobile communications terminal, a smartphone, or a tablet PC.

The plurality of camera modules 500 and 1000 may be mounted in the portable electronic device 2.

At least one of the plurality of camera modules 500 and 1000 may be the camera module 1000 described with reference to FIGS. 2 through 10.

That is, in the case of a portable electronic device including a dual camera module, at least one of two camera modules may be provided as the camera module 1000.

As set forth above, the camera module according to various examples described herein and the portable electronic device including the same may have a simple structure and a reduced size while implementing the AF function, the zoom function, the OIS function, and the like. Further, power consumption may be significantly reduced.

The camera module can have a simple structure and a reduced size while implementing the AF function, the OIS function, the zoom function, and the like.

Further, the examples described herein allow for easy alignment in the optical axis direction even when a plurality of lens groups are provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing having an internal space; and
a lens module disposed in the internal space, and comprising a plurality of lens barrels disposed along an optical axis direction,
wherein each of the plurality of lens barrels is supported movably in the optical axis direction by a plurality of ball bearings, and
wherein the number of ball bearings supporting one side of each lens barrel is different from the number of ball bearings supporting the other side of each lens barrel.

2. The camera module of claim 1, wherein the plurality of lens barrels comprise a first lens barrel and a second lens barrel, and
the number of ball bearings supporting one side of the first lens barrel is different from the number of ball bearings supporting one side of the second lens barrel.

3. The camera module of claim 2, wherein the one side of the first lens barrel is supported by two or more ball bearings, and the other side of the first lens barrel is supported by one ball bearing, and
wherein the one side of the second lens barrel is supported by one ball bearing, and the other side of the second lens barrel is supported by two or more ball bearing.

4. The camera module of claim 3, wherein the first lens barrel comprises a first lens seating portion accommodating a plurality of lenses and a first extending portion extending from one side of the first lens seating portion in the optical axis direction, and
wherein the two or more ball bearings supporting the one side of the first lens barrel are disposed between a bottom surface of the housing and a lower surface of the first extending portion.

5. The camera module of claim 4, wherein the second lens barrel comprises a second lens seating portion accommodating a plurality of lenses and a second extending portion extending in the optical axis direction from the other side opposite to one side of the second lens seating portion, and
wherein the two or more ball bearings supporting the other side of the second lens barrel are disposed between a bottom surface of the housing and a lower surface of the second extending portion.

6. The camera module of claim 3, wherein a first magnet is disposed on one surface of the first lens barrel, and
the first magnet is disposed closer to the two or more ball bearings than to the one ball bearing among the plurality of ball bearings supporting the first lens barrel.

7. The camera module of claim 6, wherein a pulling yoke is disposed on one of a bottom surface of the housing and a lower surface of the first lens barrel, and a pulling magnet is disposed on the other one.

8. The camera module of claim 7, wherein at least of the pulling yoke and the pulling magnet is biased toward the first magnet with respect to an optical axis.

9. The camera module of claim 3, wherein a second magnet is disposed on one surface of the second lens barrel, and
the second magnet is disposed closer to the two or more ball bearings than to the one ball bearing among the plurality of ball bearings supporting the second lens barrel.

10. The camera module of claim 9, wherein a pulling yoke is disposed on one of a bottom surface of the housing and a lower surface of the second lens barrel, and a pulling magnet is disposed on the other one.

11. The camera module of claim 10, wherein at least of the pulling yoke and the pulling magnet is biased toward the second magnet with respect to an optical axis.

12. The camera module of claim 1, wherein the plurality of lens barrels comprise a first lens barrel, a second lens barrel and a third lens barrel.

13. The camera module of claim 12, wherein the first lens barrel and the second lens barrel are disposed to be movable in the optical axis direction, and
the third lens barrel is fixedly disposed with respect to the housing.

14. The camera module of claim 13, further comprising a reflection module comprising a reflective member configured to change a moving direction of light, wherein the third lens barrel is disposed closest to the reflection module, among the first to third lens barrel.

15. The camera module of claim 14, wherein the housing comprises a first protruding wall, and the first protruding wall distinguishes a space in which the reflection module is disposed and a space in which the lens module is disposed.

16. The camera module of claim 15, wherein the housing comprises a second protruding wall, and the second protruding wall distinguishes a space in which the first and second lens barrels are disposed and a space in which the third lens barrel is disposed.

17. The camera module of claim 13, wherein the first and second lens barrels are configured to perform zoom or AF functions individually or in common.

18. The camera module of claim 1, wherein the first and second lens barrels are configured to perform zoom or AF functions individually or in common.

* * * * *